April 30, 1968  R. P. PERRY  3,380,372
AIR GUIDE STRUCTURE

Filed Aug. 1, 1966  2 Sheets-Sheet 1

INVENTOR
ROBERT P. PERRY

BY
*Strauch, Nolan, Neale, Nies & Bronaugh*
ATTORNEYS

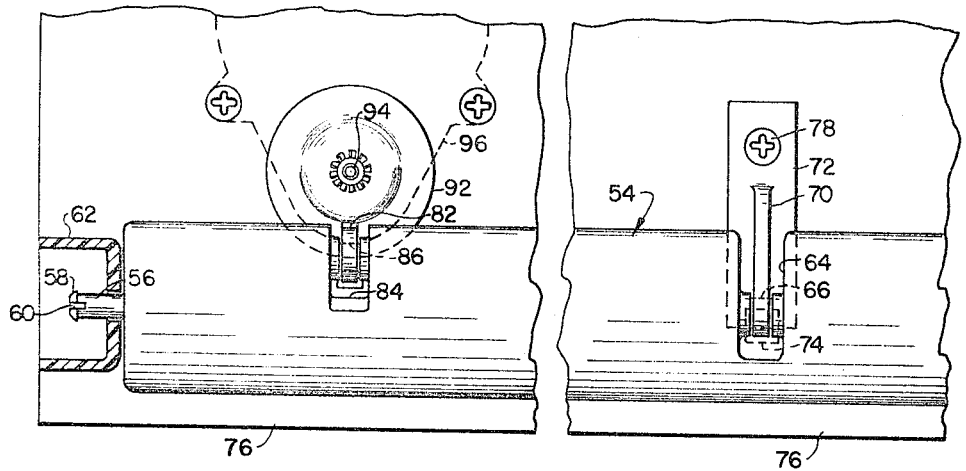
FIG.5
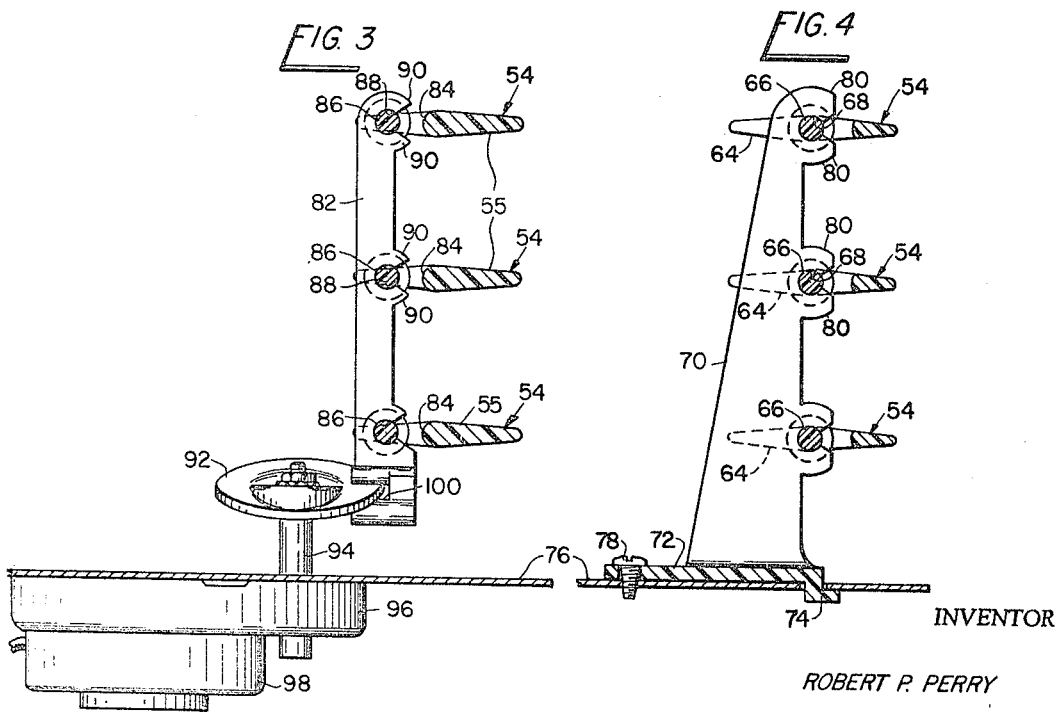
FIG. 3
FIG. 4
INVENTOR
ROBERT P. PERRY

United States Patent Office 3,380,372
Patented Apr. 30, 1968

3,380,372
AIR GUIDE STRUCTURE
Robert P. Perry, Greenville, Mich., assignor to Hupp Corporation, Cleveland, Ohio, a corporation of Virginia
Filed Aug. 1, 1966, Ser. No. 569,299
1 Claim. (Cl. 98—121)

This invention relates to air guide structure, especially such structure particularly adapted for use with window air conditioners.

The air conditioners with which the invention is primarily concerned are usually placed in a window opening and provide the only source of conditioned air for a room. Thus, it is of particular importance that the air delivered from the air conditioner be distributed to all regions of the room to avoid objectionable drafts and to eliminate stratification.

Most such air conditioners are provided with adjustable louver structure which permits the deflection of the air delivered by the air conditioner horizontally or vertically. Certain prior air conditioners are also provided with power driven oscillating louver structure which constantly moves a set of vanes or deflectors to provide constant variation in the direction of the air delivered by the air conditioner unit.

It is the primary purpose and object of the present invention to provide improved air guide structure for air conditioners including a novel arrangement for oscillating a set of vanes or louvers about horizontal axes, the louvers and their mounting structure and the drive arrangement providing an assembly which is considerably less expensive than prior constructions and which possesses unusual durability and reliability.

It is a further object of the present invention to provide an improved air guide structure for air conditioners comprising a set of power driven louvers which may be oscillated about horizontal axes in combination with a set of manually adjustable louvers arranged for swinging movement about vertical axes.

Additional objects and advantages of the invention will become apparent as the description proceeds in connection with the accompanying drawings in which.

Figure 1:
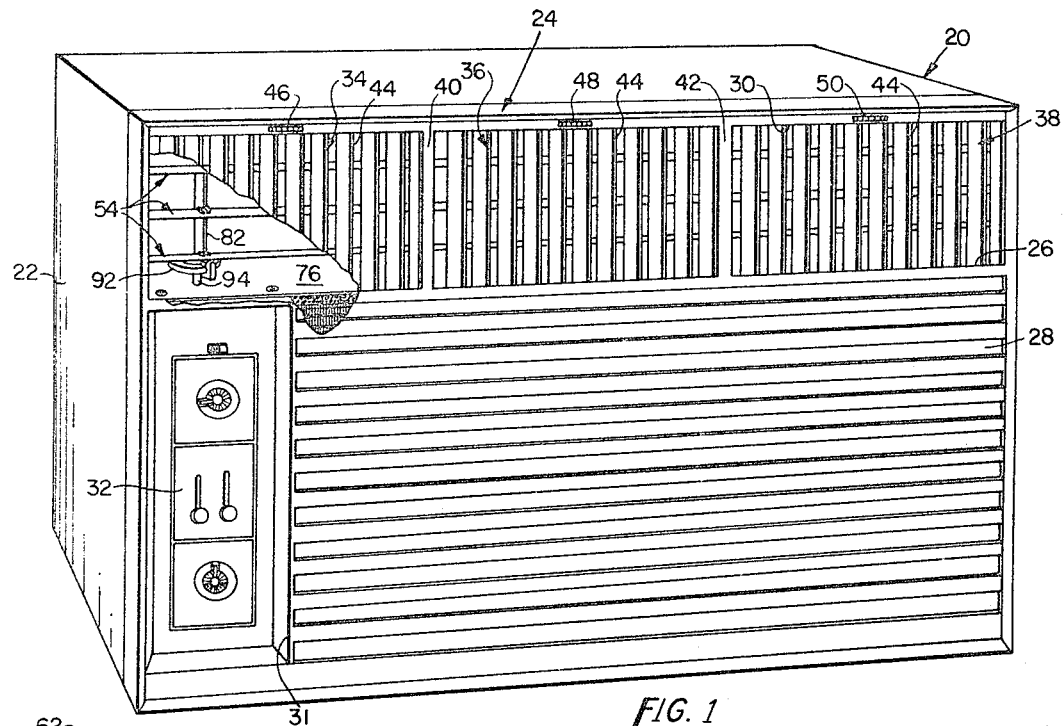
FIGURE 1 is a front elevation of a window air conditioner incorporating the air guide structure of the present invention with parts broken away to show interior details.
Figure 2:
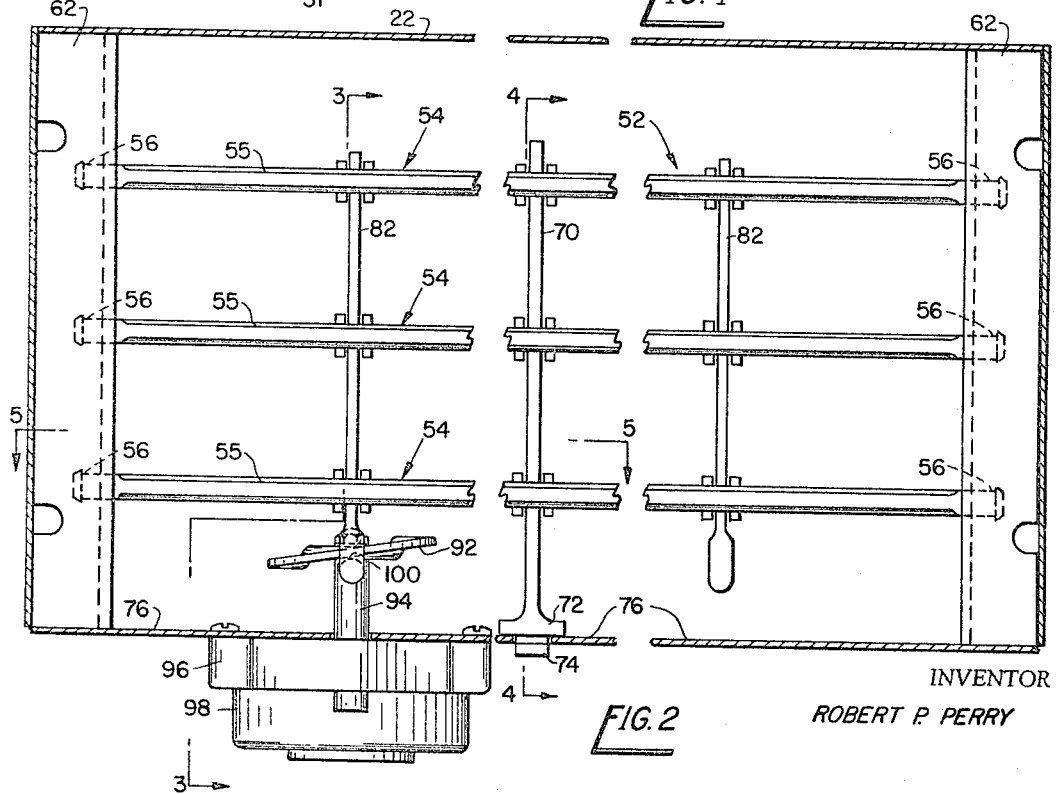
FIGURE 2 is an enlarged fragmentary front elevation of the air conditioner with the front panel removed.

FIGURES 3 and 4 are vertical sections taken along lines 3—3 and 4—4 of FIGURE 2, respectively; and FIGURE 5 is a fragmentary horizontal section taken along line 5—5 of FIGURE 2.

For purposes of illustration, the novel air guide structure of the present invention has been shown installed in a window air conditioner unit indicated generally at 20 which, apart from the air guide structure, is of essentially conventional construction. In accordance with conventional practice, the air conditioner comprises a casing 22 adapted to extend through a window, the casing enclosing the usual components including the compressor, condenser, blower, and evaporator coil. At the front of the unit is mounted a removable panel 24 divided by a horizontally extending cross-member 26 into a lower air intake section 28 and an upper air outlet section 30. The front panel 24 is also provided with a vertically elongated opening 31 to provide access to a control panel 32. The air intake section 28 is suitably louvered to permit the unimpeded flow of air inwardly over the evaporator which is positioned immediately behind it. The air then passes through conventional duct structure within the casing 22 and is delivered through the outlet opening 30 which extends across the full width of the front panel assembly.

Three groups of louvers 34, 36 and 38 extend vertically between the divider strip 26 and the top rim of the front panel assembly 24 across the full height of the air outlet opening, the louver groups being separated by vertical strips 40 and 42 which may be formed integrally with the front panel. The louver groups each comprise a series of louvers 44 pivotally mounted at their top and bottom ends, the louvers of each group being connected for co-movement and movable by single manual adjustment means conveniently operable by respective operating members 46, 48 and 50 horizontally slidable in the upper rim of the front panel. The specific construction of the louvers 34, 36 and 38 and their operating mechanism forms no part of the present invention and they may take any number of conventional forms. This arrangement of louvers permit the user to establish any desired horizontal air flow pattern.

The present invention is primarily concerned with a third group of louvers indicated generally at 52 mounted within the casing 22 behind the removable front panel assembly 24.

The louver assembly 52 comprises three identical horizontal louvers or vanes 54, each having a body portion 55 of generally airfoil section and mounting pins 56 formed integrally with their opposite ends. Preferably, the louvers are formed of a suitable plastic having limited flexibility. The pins 56 are provided with enlarged heads 58 and end slots 60 to permit the insertion of pins through openings provided in U-shaped retainer members 62, suitably secured to the air conditioner casing 22 at the opposite ends of the air outlet opening 30. With the louvers installed one above the other, as best shown in FIGURE 2, they are held against lateral or vertical displacement but are freely rotatable.

Midway of their length the louvers 54 are provided with rearwardly opening cutouts 64 across which extend cylindrical pins 66 axially aligned with the end support pins 56. As best shown in FIGURE 4 the pins 66 are each rotatably received in cylindrical support sections 68 formed in a vertically extending support member 70 having a base 72, the forward edge of which is held in place by a locking foot 74 extending through the sheet metal floor 76 forming the bottom of the air outlet opening. The rear portion of the support base is held to the floor member 76 by a screw 78.

It will be noted that the bearing mounts 68 are formed by spring fingers 80 to permit the pin 66 to be snapped into position.

The louvers 54 are connected for co-movement by a pair of identical drive links 82. To this end the louvers are provided, adjacent their opposite ends, with rearwardly opening slots 84 bridged by aligned cylindrical sections 86 offset rearwardly of the axis of oscillation of the louvers established by the pins 56 and 66. The cylindrical sections 86 are supported in bearing portions 88 in the drive link 82 the bearing portions being formed by spring fingers 90 to permit the parts to be snapped together. One of the drive links 82 is utilized to oscillate the vanes about their pivotal axes, the other drive link being used to assure co-movement of the vanes throughout their length. The driving mechanism, which will be illustrated as being associated with the drive link at the left of FIGURE 2, comprises a circular cam 92 mounted on the upper end of the output shaft 94 of a gear reduction mechanism 96 driven by a small electric motor 98, the assembly 96, 98 being carried by the under surface of the floor member 76.

As best shown in FIGURE 3 the periphery of the cam 92 extends into a rearwardly facing slot 100 in the base of the drive link 82. Accordingly, as the cam 92 is rotated, its relatively raised and lowered surface portions will be successively positioned within the slot 100 to cause the drive link to be displaced vertically oscillating the louvers 54 simultaneously in equal amounts about their horizontal axes. The slot 100 is sufficiently deep to accommodate the slight forward and rearward movement of the drive link which accompanies its vertical displacement.

In a typical case the cam 92 has a total rise sufficient to displace the drive link 82 somewhat less than ¼″ upwardly and downwardly away from its neutral position in which the louvers are horizontal. This action displaces the louvers approximately 30° up or down away from their neutral horizontal position. The motor 98 and gear reduction assembly 96 provide for rotation of the cam 92 approximately at 1 r.p.m. so that once each minute the air issuing through the outlet opening will be swept from the floor to the ceiling of the room served by the air conditioner. By stopping the cam at a desired point the louvers can be set to produce downward, horizontal, or upward flow as desired.

Actual experience has demonstrated that when the powered louvers are in operation, stratification, which produces room hot spots and warm layers of air near the ceiling is substantially eliminated. The conditioned air can be directed right, left, straight ahead or in any combination, and, with the powered louvers in operation, a continuous sweep of air is provided from the floor to the ceiling, affecting all layers of air, gently replacing heat, humidity and stuffiness at all levels with cool, dry, comfortable air thus providing a versatility of operation not heretofore attained.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by Letters Patent is:

1. Louver structure for guiding air flowing through an opening having top and bottom walls and end walls comprising a plurality of louvers adapted to extend horizontally across said opening from one end wall to the other, means supporting said louvers at their opposite ends for oscillation about horizontal axes, additional means suppotring said louvers adjacent their midpoint for rotation about said horizontal axes, generally vertically extending link means attached to each of said louvers and movable therewith to connect said louvers for comovement about said horizontal axes, an essentially circular cam, and a motor drive assembly for rotating said cam about an essentially vertical axis, said cam having successively raised and relatively lowered peripheral portions and said drive link having a slot for the reception of the periphery of said cam to be driven thereby whereby, upon rotation of said cam, said link means is moved in an essentially vertical reciprocating path to oscillate each of said louvers about their horizontal axes.

References Cited

UNITED STATES PATENTS

| | | | |
|---|---|---|---|
| 3,248,837 | 5/1966 | Newell et al. | 98—121 X |
| 3,257,931 | 6/1966 | Lupton | 98—40 |
| 3,294,007 | 12/1966 | Gleason et al. | 98—40 |
| 3,298,298 | 1/1967 | Iwata | 98—40 |

ROBERT A. O'LEARY, *Primary Examiner.*

W. E. WAYNER, *Assistant Examiner.*